US012334023B2

(12) United States Patent
Park et al.

(10) Patent No.: US 12,334,023 B2
(45) Date of Patent: Jun. 17, 2025

(54) DISPLAY DEVICE AND DISPLAY PANEL

(71) Applicant: LG DISPLAY CO., LTD., Seoul (KR)

(72) Inventors: SungMin Park, Seoul (KR); Jinu Lee, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/241,268

(22) Filed: Sep. 1, 2023

(65) Prior Publication Data

US 2024/0203364 A1 Jun. 20, 2024

(30) Foreign Application Priority Data

Dec. 16, 2022 (KR) ........................ 10-2022-0177290

(51) Int. Cl.

*G09G 3/3291* (2016.01)
*G09G 3/32* (2016.01)
*G09G 3/3266* (2016.01)

(52) U.S. Cl.

CPC ............. *G09G 3/3291* (2013.01); *G09G 3/32* (2013.01); *G09G 3/3266* (2013.01); *G09G 2310/0267* (2013.01); *G09G 2310/0275* (2013.01); *G09G 2310/08* (2013.01); *G09G 2320/0247* (2013.01)

(58) Field of Classification Search

CPC ...... G09G 3/3291; G09G 3/32; G09G 3/3266; G09G 2310/0267; G09G 2310/0275; G09G 2310/08; G09G 2320/0247; G09G 3/3233; G09G 3/3275; G09G 3/3225; G09G 2320/02; G09G 2300/0413; G09G 2300/0426; G09G 2300/0842; H10K 59/131; H10K 59/88

See application file for complete search history.

(56) References Cited

U.S. PATENT DOCUMENTS

2016/0307528 A1* 10/2016 Zou .......................... G09G 3/03
2018/0122302 A1* 5/2018 Koong ................. G09G 3/3266
2022/0320189 A1* 10/2022 Lee ...................... H10K 59/353

* cited by examiner

*Primary Examiner* — Abhishek Sarma
(74) *Attorney, Agent, or Firm* — Fish & Richardson P.C.

(57) ABSTRACT

A display panel includes a plurality of subpixels, a plurality of data lines, and a plurality of gate lines. A data driving circuit supplies a data voltage to the data lines. A gate driving circuit supplies a gate signal to the gate lines. A timing controller controls the data driving circuit and the gate driving circuit. A display area of the display panel includes a first area corresponding to the data driving circuit and a second area located outside of the first area. A first data link line group having a linear structure is connected to a first data line group disposed in the first area. A second data link line group having a bending structure is connected to a second data line group disposed in the second areas.

13 Claims, 13 Drawing Sheets

DISPLAY DEVICE AND DISPLAY PANEL

CROSS-REFERENCE TO RELATED APPLICATION

This application claims the priority of Korean Patent Application No. 10-2022-0177290, filed on Dec. 16, 2022, which is hereby incorporated by reference in its entirety.

BACKGROUND

Field of the Disclosure

The present disclosure relates to, for example, without limitation, a display device and a display panel, and more particularly, to a display device and a display panel having an alignment structure of data lines by which a narrow bezel may be obtained.

Description of the Background

In response to the development of the information society, a variety of demands for image display devices are increasing. In this regard, a range of display devices, such as liquid crystal display (LCD) devices, plasma display panel (PDP) devices and organic light-emitting display devices, have recently come into widespread use.

Among such display devices, the organic light emitting display device is a self-luminance display device using an organic light emitting diode which injects holes from an anode and electrons from a cathode into a light emitting layer and emits light when an exciton generated by combination of the injected holes and electrons changes its state from an excited state to a ground state.

The organic light emitting display device may be categorized into a top emission type, a bottom emission type, and a dual emission type depending on an emitted direction of light, and may be categorized into a passive matrix type and an active matrix type depending on a driving method.

The organic light emitting display device does not need a separate light source unlike a liquid crystal display (LCD) device and thus may be manufactured into a lightweight and thin form. Further, the organic light emitting display device is advantageous in view of power consumption since it is driven with a low voltage. Also, the organic light emitting display device has excellent color expression ability, a high response speed, a wide viewing angle, and a high contrast ratio (CR). Therefore, the organic light emitting display device has been researched as a next-generation display device.

The organic light emitting display device has been developed in a structure of large area and/or ultra-high resolution, whereby a size of a pixel has been reduced. In this respect, a high aperture ratio structure for enhancing a ratio of an opening area in a pixel has been required. As opening areas are increased, the probability of occurrence of a pixel defect is increased in ultra-high resolution. When a defect occurs in a pixel, the pixel is connected with another pixel, which has the same color as that of the above pixel and is adjacent thereto, whereby the pixel having a defect may not be recognized by a user. Considering these various circumstances, the development of a display device, which may make sure of a high aperture ratio in a large area and/or ultra-high resolution and has a repair structure for a pixel having a defect, will be required.

Among such display devices, organic light-emitting display devices are advantageous in terms of rapid response rates, high contrast ratios, high emission efficiency, high luminance, wide viewing angles, and the like because organic light-emitting diodes emitting light by themselves are used therein.

Such an organic light-emitting display device may include organic light-emitting diodes (OLEDs) disposed in a plurality of subpixels arrayed in a display panel, and may control the OLEDs to emit light by controlling current flowing through the OLEDs, thereby displaying an image while controlling the luminance of the subpixels.

In such display devices, research into minimizing or reducing the width of the bezel formed outside a display area is being actively undertaken to reduce the overall weight and size of a display device and to make the appearance of the display device more aesthetically appealing.

The description provided in the background section should not be assumed to be prior art merely because it is mentioned in or associated with the background section. The background section may include information that describes one or more aspects of the subject technology.

SUMMARY

Accordingly, the present disclosure is directed to a display device and a display panel that substantially obviate one or more of problems due to limitations and disadvantages described above.

More specifically, the present disclosure is to provide a display device and a display panel having a structure able to prevent or reduce degradations in image quality while realizing a narrow bezel.

Various aspects of the present disclosure may provide a display device and a display panel having a modified structure of data link lines able to realize a narrow bezel and prevent or reduce degradations in image quality.

Various aspects of the present disclosure may provide a display device and a display panel having a structure by which data lines disposed in a first area corresponding to a data driving circuit may be connected to a first data link line group having a linear structure and data lines disposed in a second area corresponding to a location outside the first area may be connected to a second data link line group having a bending structure, whereby a narrow bezel may be realized.

Various aspects of the present disclosure may provide a display device and a display panel having a structure by which a second data link line may be disposed along a position of low coupling capacitance in a first area corresponding to a data driving circuit, whereby degradations in image quality may be prevented or reduced.

Additional features and aspects of the disclosure are set forth in part in the description that follows and in part will become apparent from the description or may be learned by practice of the inventive concepts provided herein. Other features and aspects of the inventive concepts may be realized and attained by the structures pointed out in the present disclosure, or derivable therefrom, and the claims hereof as well as the appended drawings.

Various aspects of the present disclosure may provide a display device including: a display panel including a plurality of subpixels, a plurality of data lines, and a plurality of gate lines; a data driving circuit supplying a data voltage to the plurality of data lines; a gate driving circuit supplying a gate signal to the plurality of gate lines; a timing controller controlling the data driving circuit and the gate driving circuit. The display panel may include a display area. The display area may include a first area corresponding to the data driving circuit and second areas located outside of the first area. The display device may further include a first data link line group having a linear structure and connected to a first data line group disposed in the first area among the plurality of data lines; and a second data link line group having a bending structure and connected to a second data line group disposed in the second areas among the plurality of data lines.

Various aspects of the present disclosure may provide a display panel including: a plurality of subpixels; a plurality of data lines including a first data line group disposed in a first area corresponding to a data driving circuit and a second data line group disposed in a second areas located outside of the first area; a plurality of gate lines; a first data link line group having a linear structure connected to the first data line group disposed in the first area; and a second data link line group having a bending structure connected to the second data line group disposed in the second areas.

According to various aspects, the display device and the display panel may prevent or reduce degradations in image quality while realizing a narrow bezel.

According to various aspects, the display device and the display panel may have a modified structure of data link lines, thereby realizing a narrow bezel and preventing or reducing degradations in image quality.

According to various aspects, in the display device and the display panel, data lines disposed in the first area corresponding to the data driving circuit may be connected to the first data link line group having a linear structure and data lines disposed in the second areas located outside of the first area may be connected to the second data link line group having a bending structure, whereby a narrow bezel may be realized.

According to various aspects, in the display device and the display panel, the second data link line may be disposed along a position of low coupling capacitance in the first area corresponding to the data driving circuit, whereby degradations in image quality may be prevented or reduced.

It is to be understood that both the foregoing general description and the following detailed description are exemplary and explanatory and are intended to provide further explanation of the inventive concepts as claimed.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

BRIEF DESCRIPTION OF THE DRAWINGS

The accompanying drawings, that may be included to provide a further understanding of the disclosure and may be incorporated in and constitute a part of the disclosure, illustrate aspects of the disclosure and together with the description serve to explain various principles of the disclosure.

The above and other features and advantages of the present disclosure will be more clearly understood from the following detailed description, taken in conjunction with the accompanying drawings, in which.

Figure 1:
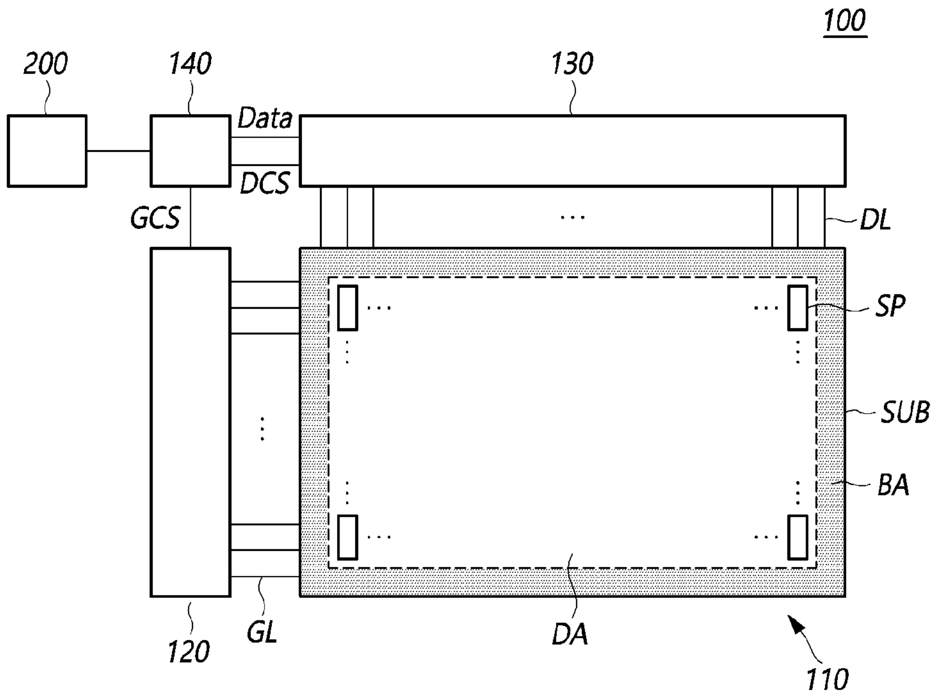
FIG. 1 is a diagram schematically illustrating a display device according to example aspects of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Hereinafter, some aspects of the present disclosure will be described in detail with reference to exemplary drawings. In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects may be provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example aspects of the present disclosure are merely given by way of example. Therefore, the present disclosure is not limited to the illustrations in the drawings. The same or similar elements are designated by the same reference numerals throughout the specification unless otherwise specified.

The terms such as "including", "having", "containing", "constituting", "made up of", and "formed of" used herein are generally intended to allow other components to be added unless the terms are used with the term such as "only". As used herein, singular forms are intended to include plural forms unless the context clearly indicates otherwise. Any implementation described herein as an "example" is not necessarily to be construed as preferred or advantageous over other implementations.

Terms, such as "first", "second", "1-1th," "1-2th," "2-1th," "2-2th," "A", "B", "(A)", or "(B)" may be used herein to describe elements of the present disclosure. Each of these terms is not used to define essence, order, sequence, or number of elements etc., but is used merely to distinguish the corresponding element from other elements. For example, a first component may be referred to as a second component and, similarly, the second component may be referred to as the first component, without departing from the scope of the present disclosure.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

Where positional relationships are described, for example, where the positional relationship between two parts is described using "on," "over," "under," "above," "below," "beneath," "near," "close to," or "adjacent to," "beside," "next to," or the like, one or more other parts may be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "may".

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Features of various aspects of the present disclosure may be partially or overall coupled to or combined with each other, and may be variously inter-operated with each other and driven technically as those skilled in the art may sufficiently understand. Aspects of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, various aspects of the present disclosure will be described in detail with reference to the accompanying drawings.

FIG. 1 is a diagram schematically illustrating a display device according to example aspects of the present disclosure.

Referring to FIG. 1, a display device 100 according to example aspects of the present disclosure may include a display panel 110 and a driving circuit for driving the display panel 110.

The display panel 110 may include a display area DA on which images are displayed and a bezel area BA on which no images are displayed. The bezel area BA may be disposed near or outside the display area DA and may also be referred to as a non-display area. The bezel area BA may include a driver for supplying various signals to a plurality of signal lines in the display area DA, and a link portion for connecting the driver with the plurality of signal lines. The driver may include a gate driver for supplying a gate signal to a gate line, and a data driver for supplying a data signal to a data line.

The display panel 110 may include a plurality of subpixels SP to display images. For example, the plurality of subpixels SP may be disposed in the display area DA. In some cases, at least one subpixel SP may be disposed in the bezel area BA. The at least one subpixel SP disposed in the bezel area BA is referred to as a dummy subpixel.

The display panel 110 may include a plurality of signal lines to drive the plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixels SP. For example, the other signal lines may include driving voltage lines, reference voltage lines, emission control lines, and the like, and the present disclosure is not limited thereto.

The plurality of data lines DL may intersect the plurality of gate lines GL. Each of the plurality of data lines DL may be disposed to extend in a first direction. Each of the plurality of gate lines GL may be disposed to extend in a second direction intersecting with the first direction. For example, the first direction may be a column direction, while the second direction may be a row direction. In this specification, the column direction and the row direction are relative terms. In an example, the column direction may be a vertical direction, while the row direction may be a horizontal direction. In another example, the column direction may be a horizontal direction, while the row direction may be a vertical direction.

The driving circuit may include a data driving circuit 130 to drive the plurality of data lines DL and a gate driving circuit 120 to drive the plurality of gate lines GL. The driving circuit may further include a timing controller 140 to control the data driving circuit 130 and the gate driving circuit 120.

The data driving circuit 130 is a circuit to drive the plurality of data lines DL, and may output data signals (also referred to as data voltages) corresponding to an image signal to the plurality of data lines DL. The gate driving circuit 120 is a circuit to drive the plurality of gate lines GL, and may generate gate signals and output the gate signals to the plurality of gate lines GL. The gate signals may include one or more scan signals and an emission signal.

The timing controller 140 may start scanning in timing set for respective frames and control data driving at appropriate points in time in response to the scanning. The timing controller 140 may convert image data input from an external source into image data Data having a data signal format readable by the data driving circuit 130 and output the image data Data to the data driving circuit 130.

The timing controller 140 may receive display drive control signals together with the input image data from a host system 200. For example, the display drive control signals may include a vertical synchronization signal, a horizontal synchronization signal, an input data enable signal, a clock signal, and the like.

The timing controller 140 may generate a data drive control signal DCS and a gate drive control signal GCS on the basis of the display drive control signals input from the host system 200. The timing controller 140 may control the drive operation and the drive timing of the data driving circuit 130 by supplying the data drive control signal DCS to the data driving circuit 130. The timing controller 140 may control the drive operation and the drive timing of the gate driving circuit 120 by supplying the gate drive control signal GCS to the gate driving circuit 120.

The timing controller 140 may be mounted on a printed circuit board, a flexible printed circuit, or the like. The timing controller 140 may be electrically connected to the gate driving circuit 120 and the data driving circuit 130 through the printed circuit board, the flexible printed circuit, or the like.

The timing controller 140 may allow the gate driving circuit 120 to output a scan signal according to the timing implemented in each frame. The timing controller 140 may convert a data signal received from the outside (e.g., a host system) to conform to the data signal format used in the data driving circuit 130 and then output the converted image data DATA to the data driving circuit 130.

The timing controller 140 may receive, from the outside (e.g., a host system), various timing signals including a vertical synchronization signal VSYNC, a horizontal synchronization signal HSYNC, an input data enable DE signal, a clock signal CLK, and the like, as well as the image data.

The timing controller 140 may generate various control signals using various timing signals received from the outside, and may output the control signals to the gate driving circuit 120 and the data driving circuit 130.

For example, to control the gate driving circuit 120, the timing controller 140 may output various gate control signals GCS including a gate start pulse GSP, a gate shift clock GSC, a gate output enable signal GOE, or the like.

The gate start pulse GSP may control operation start timing of one or more gate driver integrated circuits GDIC constituting the gate driving circuit 120. The gate shift clock GSC, which is a clock signal commonly input to one or more gate driver integrated circuits GDIC, may control the shift timing of a scan signal. The gate output enable signal GOE may specify timing information on one or more gate driver integrated circuits GDIC.

In addition, to control the data driving circuit 130, the timing controller 140 may output various data control signals DCS including a source start pulse SSP, a source sampling clock SSC, a source output enable signal SOE, or the like.

The source start pulse SSP may control a data sampling start timing of one or more source driver integrated circuits SDIC constituting the data driving circuit 130. The source sampling clock SSC may be a clock signal for controlling the timing of sampling data in the respective source driver integrated circuits SDIC. The source output enable signal SOE may control the output timing of the data driving circuit 130.

Figure 2:
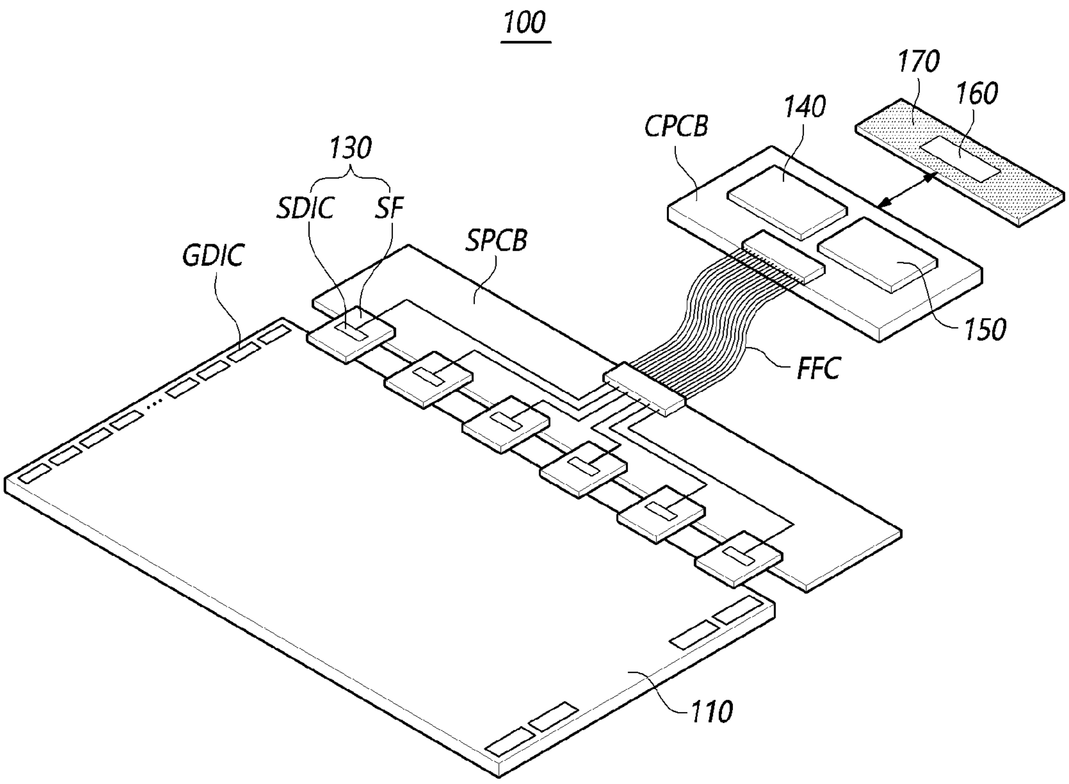
FIG. 2 is an example diagram illustrating a system of the display device according to example aspects of the present disclosure.

The data driving circuit 130 may include one or more source driving integrated circuits SDIC (see FIG. 2). Each of the source driving integrated circuits SDIC may include a shift register, a level shifter, a latch circuit, a digital-to-analog converter (DAC), an output buffer, and the like. Each of the source driving integrated circuits SDIC may further include an analog-to-digital converter (ADC).

For example, each of the source driving integrated circuits SDIC may be connected to the display panel 110 using a tape-automated bonding (TAB) structure, may be connected to a bonding pad of the display panel 110 using a chip-on-glass (COG) structure or a chip-on-panel COP structure, or may be implemented using a chip-on-film (COF) structure connected to the display panel 110. In this case, each source driving integrated circuit SDIC may be mounted on a film connected to the display panel 110, and may be electrically connected to the display panel 110 through wires on the film.

The gate driving circuit 120 may output a gate signal having a turn-on-level voltage or a gate signal having a turn-off-level voltage under the control of the timing controller 140. The gate driving circuit 120 may sequentially drive the plurality of gate lines GL by sequentially supplying the gate signal having a turn-on-level voltage to the plurality of gate lines GL.

The gate driving circuit 120 may include one or more gate driving integrated circuits GDIC (see FIG. 2).

The gate driving circuit 120 may be connected to the display panel 110 using a TAB structure, connected to bonding pads of the display panel 110 using a COG structure or a COP structure, or connected to the display panel 110 using a COF structure. Alternatively, the gate driving circuit 120 may be implemented using a gate-in-panel (GIP) structure provided in the bezel area BA of the display panel 110. The gate driving circuit 120 may be disposed on a circuit board or connected to the circuit board. For example, when the gate driving circuit 120 has a GIP structure, the gate driving circuit 120 may be disposed in the bezel area BA. When the gate driving circuit 120 has a COG structure, a COF structure, or the like, the gate driving circuit 120 may be connected to the circuit board.

In addition, at least one driving circuit of the data driving circuit 130 and the gate driving circuit 120 may be disposed in the display area DA. For example, at least one driving circuit of the data driving circuit 130 and the gate driving circuit 120 may be disposed to not overlap with the subpixels SP or disposed such that a portion or the entirety thereof overlaps with the subpixels SP.

The data drive data driving circuit 130 may be connected to one side (e.g., the upper side or the lower side) of the display panel 110. The data drive data driving circuit 130 may be connected to both sides (e.g., the upper side and the lower side) of the display panel 110 or two or more sides of four sides of the display panel 110, depending on the driving method, the design of the display panel, or the like.

The gate driving circuit 120 may be connected to one side (e.g., the left side or the right side) of the display panel 110. The gate driving circuit 120 may be connected to both sides (e.g., the left side and the right side) of the display panel 110 or two or more sides of four sides of the display panel 110, depending on the driving method, the design of the display panel, or the like.

The timing controller 140 may be provided as a component separate from the data driving circuit 130 or may be combined with the data driving circuit 130 to form an integrated circuit (IC). The timing controller 140 may be a timing controller used in typical display technology, may be a control device including a timing controller and performing other control functions, or may be a circuit in the control device. The timing controller 140 may be implemented as any of a variety of circuits or electronic components such as an IC, a field programmable gate array (FPGA), an application specific integrated circuit (ASIC), or a processor.

The timing controller 140 may supply various control signals to the gate driving circuit 120 and the data driving circuit 130, and control the operation of the gate driving circuit 120 and the data driving circuit 130.

The timing controller 140 may be mounted on a printed circuit board (PCB), a flexible printed circuit (FPC), or the like, and may be electrically connected to the data driving circuit 130 and the gate driving circuit 120 through the PCB, the FPC, or the like. The timing controller 140 may transmit and receive signals to and from the data driving circuit 130 according to predetermined one or more interfaces. Here, for example, the interfaces may include a low voltage differential signaling (LVDS) interface, an embedded panel interface (EPI), a serial peripheral (SP) interface, and the like.

The display device 100 according to aspects may be a self-light-emitting display device in which the display panel 110 emits light by itself. When the display device 100 according to aspects is a self-light-emitting display device, each of the plurality of subpixels SP may include a light-emitting element. In an example, the display device 100 according to aspects may be an organic light-emitting display device in which light-emitting elements are organic light-emitting diodes (OLEDs). In another example, the display device 100 according to aspects may be an inorganic light-emitting display device in which light-emitting elements are light-emitting diodes (LEDs) based on an inorganic material. In another example, the display device 100 according to aspects may be a quantum dot display device in which light-emitting elements are quantum dots serving as self-light-emitting semiconductor crystals.

FIG. 2 is an example diagram illustrating a system of the display device according to various aspects of the present disclosure.

Referring to FIG. 2, the display device 100 according to aspects is an example in which the data driving circuit 130 is implemented using a COF structure from among a variety of structures such as TAB, COG, and COF structures, and the gate driving circuit 120 is implemented using a GIP structure from among a variety of structures such as TAB, COG, COF, and GIP structures.

When the gate driving circuit 120 has the GIP structure, the plurality of gate driving integrated circuits GDIC of the gate driving circuit 120 may be directly formed in the bezel area of the display panel 110. Here, the gate driving integrated circuits GDIC may be provided with a variety of signals (e.g., a clock, a gate high signal, and a gate low signal) required for generation of scan signals through gate driving-related signal lines disposed in the bezel area.

In the same manner, the source driving integrated circuits SDIC of the data driving circuit 130 may be mounted on source films SF, respectively. One side of each of the source films SF may be electrically connected to the display panel 110. In addition, conductive lines electrically connecting the source driving integrated circuits SDIC to the display panel 110 may be disposed on the surfaces of the source films SF.

The display device 100 may include at least one source printed circuit board SPCB and a control printed circuit board CPCB for circuit connection of the plurality of source driving integrated circuits SDIC to other devices. Here, control components and a variety of electrical devices may be mounted on the control printed circuit board CPCB.

Here, the other sides of the source films SF on which the source driving integrated circuits SDIC are mounted may be connected to the source printed circuit board SPCB. For example, each of the source films SF on which the source driving integrated circuits SDIC are mounted may be configured such that one side thereof is electrically connected to the display panel 110 and the other side thereof is electrically connected to the source printed circuit board SPCB.

The timing controller 140 and a power management circuit 150 may be mounted on the control printed circuit board CPCB. The timing controller 140 may control the operation of the data driving circuit 130 and the gate driving circuit 120. The power management circuit 150 may supply a driving voltage or current to the display panel 110, the data driving circuit 130, the gate driving circuit 120, and the like and may control the supplied voltage or current.

The source printed circuit board SPCB and the control printed circuit board CPCB may be circuit-connected to each other through at least one connecting member. The connecting member may be, for example, a flexible flat cable FFC, a flexible printed circuit (FPC), or the like. In addition, the source printed circuit board SPCB and the control printed circuit board CPCB may be integrated into a single printed circuit board (PCB).

The display device 100 may further include a set board 170 electrically connected to the control printed circuit board CPCB. Here, the set board 170 may also be referred to as a power board. The set board 170 may be provided with a main power management circuit 160 to manage the overall power of the display device 100. The main power management circuit 160 may work in concert with the power management circuit 150.

In the display device 100 having the above-described configuration, a driving voltage is generated by the set board 170 and is transferred to the power management circuit 150 in the control printed circuit board CPCB. The power management circuit 150 transfers the driving voltage, required for display driving or characteristic value sensing, to the source printed circuit board SPCB through the flexible printed circuit or the flexible flat cable FFC. The driving voltage transferred to the source printed circuit board SPCB is supplied through the driving integrated circuits SDIC to light or sense a specific subpixel SP in the display panel 110.

Although FIG. 2 provides an example of a specific configuration of the system of the display device 100, it is to be noted that, the present disclosure is not limited thereto, and various other configurations may also be possible.

Here, each of the subpixels SP arrayed in the display panel 110 of the display device 100 may include a light-emitting element and circuit elements, such as a driving transistor, for driving the light-emitting element.

The type and number of the circuit elements provided in each of the subpixels SP may be determined variously depending on functions to be provided, designs, and the like.

Figure 3:
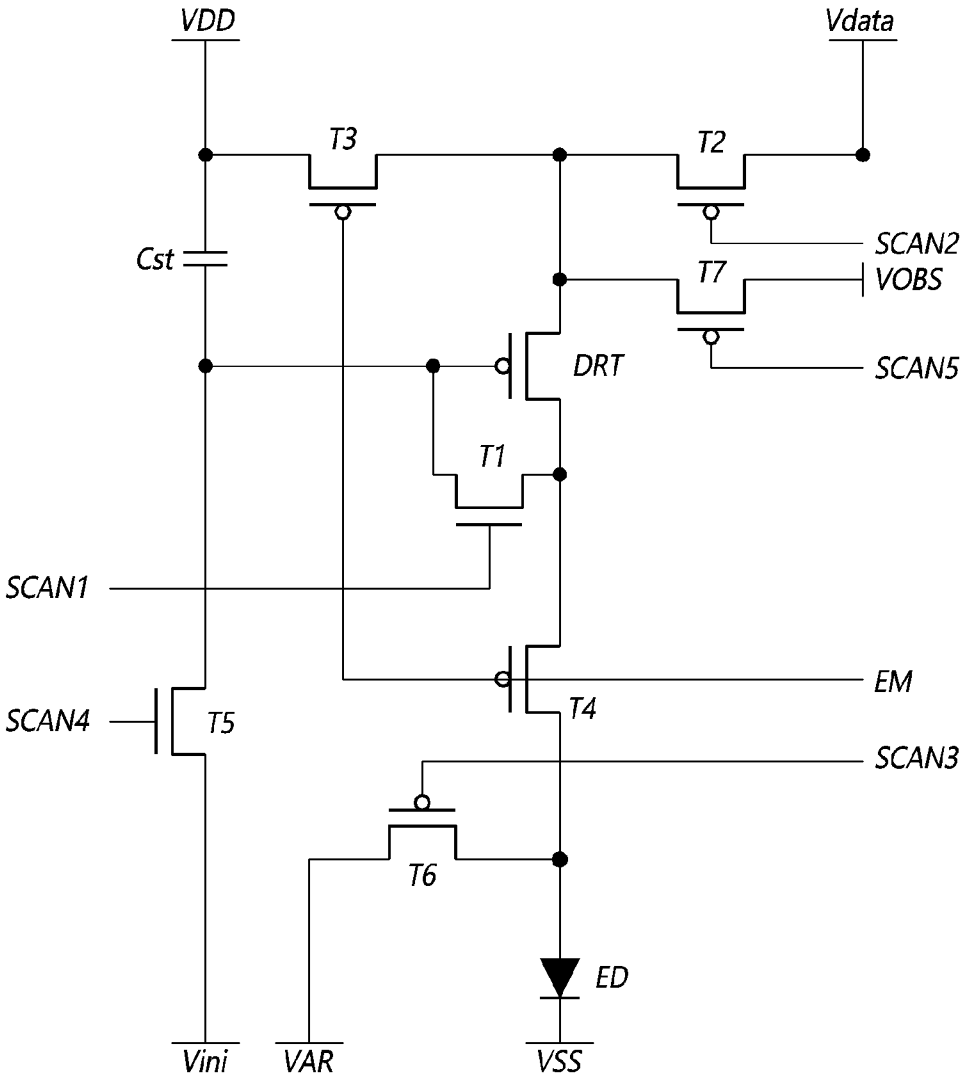
FIG. 3 is a diagram illustrating a subpixel circuit in the display device according to example aspects of the present disclosure.

FIG. 3 is a diagram illustrating a subpixel circuit in the display device according to various aspects of the present disclosure.

Referring to FIG. 3, a subpixel SP in the display device 100 according to aspects may include first to seventh switching transistors T1 to T7, a driving transistor DRT, a storage capacitor Cst, and a light-emitting element ED.

Here, the light-emitting element ED may be, for example, a self-light-emitting element, such as an organic light-emitting diode (OLED), able to emit light by itself.

In the subpixel SP according to some example aspects, the second to fourth switching transistors T2 to T4, the sixth switching transistor T6, the seventh switching transistor T7, and the driving transistor DRT may be P-type transistors, while the first switching transistor T1 and the fifth switching transistor T5 may be N-type transistors. However, the present disclosure is not limited thereto, and each of these transistors may be an N-type transistor or a P-type transistor, as required.

P-type transistors may be more reliable than N-type transistors. P-type transistors have an advantage in that current flowing through the light-emitting element ED is not fluctuated by the capacitor Cst, since the source electrode may be fixed to a high-potential driving voltage VDD during lighting. Thus, it is easy to reliably supply current.

When a P-type transistor is connected to the anode of the light-emitting element ED and operates in a saturation region, a predetermined amount of current may be flown irrespective of changes in the threshold voltage. Thus, reliability is relatively high.

In this structure of the subpixel SP, each of the N-type transistors T1 and T5 may be formed of an oxide transistor (e.g., a transistor having a channel formed from an oxide semiconductor such as an In, Ga, or Zn oxide and indium gallium zinc oxide (IGZO)) formed of a semiconducting oxide, while each of the P-type transistors DRT, T2 to T4, T6, and T7 may be a silicon (Si) transistor (e.g., a transistor referred to as a low-temperature polycrystalline silicon (LTPS) transistor having a poly-Si channel formed using a low-temperature process) formed from a transistor material such as Si.

The oxide transistor is characterized by a lower leakage current than the silicon transistor. Thus, when a transistor is formed of an oxide transistor, a leakage current from the gate electrode of the driving transistor DRT may be prevented or reduced, thereby reducing defects in image quality such as flicker.

In addition, each of the P-type transistors DRT, T2 to T4, T6, and T7, except for the N-type transistors such as the first switching transistor T1 and the fifth switching transistor T5, may be formed of an LTPS transistor.

The source electrode and the drain electrode of each of the switching transistors may be referred to as a drain electrode and a source electrode depending on the input voltage.

The gate electrode of the first switching transistor T1 is provided with a first scan signal SCAN1. The drain electrode of the first switching transistor T1 is connected to the gate electrode of the driving transistor DRT. In addition, the source electrode of the first switching transistor T1 is connected to the drain electrode of the driving transistor DRT.

The first switching transistor T1 is turned on by the first scan signal SCAN1 to maintain the gate voltage of the driving transistor DRT constant using the storage capacitor Cst, one terminal of which is fixed to the high-potential driving voltage VDD.

The first switching transistor T1 may be formed of an N-type MOS transistor to form an oxide transistor. Since N-type MOS transistors use electrons as carriers instead of holes, N-type MOS transistors may have higher mobility and thus higher switching speeds than P-type MOS transistors.

The gate electrode of the second switching transistor T2 is provided with a second scan signal SCAN2. The source electrode of the second switching transistor T2 may be provided with a data voltage Vdata. The drain electrode of the second switching transistor T2 is connected to the source electrode of the driving transistor DRT.

The second switching transistor T2 is turned on by the second scan signal SCAN2 to supply the data voltage Vdata to the source electrode of the driving transistor DRT.

The gate electrode of the third switching transistor T3 is provided with an emission signal EM. The source electrode of the third switching transistor T3 is provided with the high-potential driving voltage VDD. The drain electrode of the third switching transistor T3 is connected to the source electrode of the driving transistor DRT.

The third switching transistor T3 is turned on by the emission signal EM to supply the high-potential driving voltage VDD to the source electrode of the driving transistor DRT.

The gate electrode of the fourth switching transistor T4 is provided with the emission signal EM. The source electrode of the fourth switching transistor T4 is connected to the drain electrode of the driving transistor DRT. The drain electrode of the fourth switching transistor T4 is connected to the anode of the light-emitting element ED.

The fourth switching transistor T4 is turned on by the emission signal EM to supply a driving current to the anode of the light-emitting element ED.

The gate electrode of the fifth switching transistor T5 is provided with a fourth scan signal SCAN4.

Here, the fourth scan signal SCAN4 may be a signal having a different phase from the first scan signal SCAN1 supplied to a subpixel SP in another position. For example, when the first scan signal SCAN1 is applied to the nth gate line, the fourth scan signal SCAN4 may be a first scan signal SCAN1[n−1] applied to the (n−1)th gate line. For example, the fourth scan signal SCAN4 may use the first scan signal SCAN1, the gate line GL of which differs depending on the phase at which the display panel 110 is driven.

The drain electrode of the fifth switching transistor T5 is provided with a stabilization voltage (which is also referred to as an initialization voltage) Vini. The source electrode of the fifth switching transistor T5 is connected to the gate electrode of the driving transistor DRT and the storage capacitor Cst.

The fifth switching transistor T5 is turned on by the fourth scan signal SCAN4 to supply a stabilization voltage Vini to the gate electrode of the driving transistor DRT.

The gate electrode of the sixth switching transistor T6 is provided with a third scan signal SCAN3.

The source electrode of the sixth switching transistor T6 is provided with a reset voltage VAR. The drain electrode of the sixth switching transistor T6 is connected to the anode of the light-emitting element ED.

The sixth switching transistor T6 is turned on by the third scan signal SCAN3 to supply the reset voltage VAR to the anode of the light-emitting element ED.

The gate electrode of the seventh switching transistor T7 is provided with a fifth scan signal SCAN5.

The source electrode of the seventh switching transistor T7 is provided with a bias voltage VOBS. The drain electrode of the seventh switching transistor T7 is connected to the source electrode of the driving transistor DRT.

Here, the fifth scan signal SCAN5 may be a signal having a different phase from the third scan signal SCAN3 supplied to a subpixel SP in another position. For example, when the third scan signal SCAN3 is applied to the nth gate line, the fifth scan signal SCAN5 may be a third scan signal SCAN3 applied to the (n−1)th gate line. For example, the fifth scan signal SCAN5 may use the third scan signal SCAN3, the gate line GL of which differs depending on the phase at which the display panel 110 is driven.

In addition, since the fifth scan signal SCAN5 is a signal for applying the bias voltage VOBS to the driving transistor DRT, the fifth scan signal SCAN5 may be distinguished from the second scan signal SCAN2 for applying the data voltage Vdata.

The gate electrode of the driving transistor DRT is connected to the drain electrode of the first switching transistor T1. The source electrode of the driving transistor DRT is connected to the drain electrode of the second switching transistor T2. The drain electrode of the driving transistor DRT is connected to the source electrode of the first switching transistor T1.

The driving transistor DRT is turned on due to the difference in voltage between the gate electrode and one of the source electrode and the drain electrode, and thus the driving current is applied to the light-emitting element ED.

The source electrode and the drain electrode of the first switching transistor T1 are connected to the drain electrode and the gate electrode of the driving transistor DRT, respectively. The operation of sampling and compensating for the threshold voltage of the driving transistor DRT may be activated by the data voltage Vdata applied to the source electrode of the driving transistor DRT in a state in which the first switching transistor T1 is turned on.

One electrode of the storage capacitor Cst is provided with the high-potential driving voltage VDD, and the other electrode of the storage capacitor Cst is connected to the gate electrode of the driving transistor DRT. The storage capacitor Cst stores the voltage of the gate electrode of the driving transistor DRT.

The anode of the light-emitting element ED is connected to the drain electrode of the fourth switching transistor T4 and the drain electrode of the sixth switching transistor T6. A low-potential driving voltage VSS is applied to the cathode of the light-emitting element ED.

The light-emitting element ED generates light having a predetermined luminous intensity using the driving current flowing therethrough due to the driving transistor DRT.

Here, the stabilization voltage Vini is supplied to stabilize changes in capacitance created in the gate electrode of the driving transistor DRT, while the reset voltage VAR is supplied to reset the anode of the light-emitting element ED.

When the reset voltage VAR is supplied to the anode of the light-emitting element ED in a state in which the fourth switching transistor T4 located between the anode of the light-emitting element ED and the driving transistor DRT to be controlled by the emission signal EM is turned off, the anode of the light-emitting element ED may be reset.

The sixth switching transistor T6 supplying the reset voltage VAR is connected to the anode of the light-emitting element ED.

The fourth scan signal SCAN4 for driving the driving transistor DRT or stabilizing the driving transistor DRT and the third scan signal SCAN3 for controlling the supply of the reset voltage VAR to the anode of the light-emitting element ED are separated so that the operation of driving the driving transistor DRT and the operation of resetting the anode of the light-emitting element ED may be performed separately.

In this case, the subpixel SP may be configured such that when the switching transistors T5 and T6 supplying the stabilization voltage Vini and the reset voltage VAR are turned on, the fourth switching transistor T4 connecting the drain electrode of the driving transistor DRT and the anode of the light-emitting element ED is turned off to block flow of the driving current of the driving transistor DRT to the anode of the light-emitting element ED and prevent or reduce other voltages from having an effect on the anode than the reset voltage VAR.

The subpixel SP including the eight transistors DRT, T1, T2, T3, T4, T5, T6, and T7 and the single capacitor Cst as described above may be referred to as having an 8T1C structure.

The 8T1C structure among a variety of circuit structures of the subpixel SP has been illustrated hereinabove, but the present disclosure is not limited thereto, and the structure and number of the transistors and the capacitors of the subpixel SP may be changed variously. For example, 3T1C, 4T1C, 5T1C, 3T2C, 4T2C, 5T2C, 6T2C, 7T1C, 7T2C, 8T2C and the like structures are also possible, and more or less transistors and capacitors could be included. Respective subpixels among the plurality of subpixels SP may have the same structure or some subpixels among the plurality of subpixels SP may have a different structure.

Figure 4:
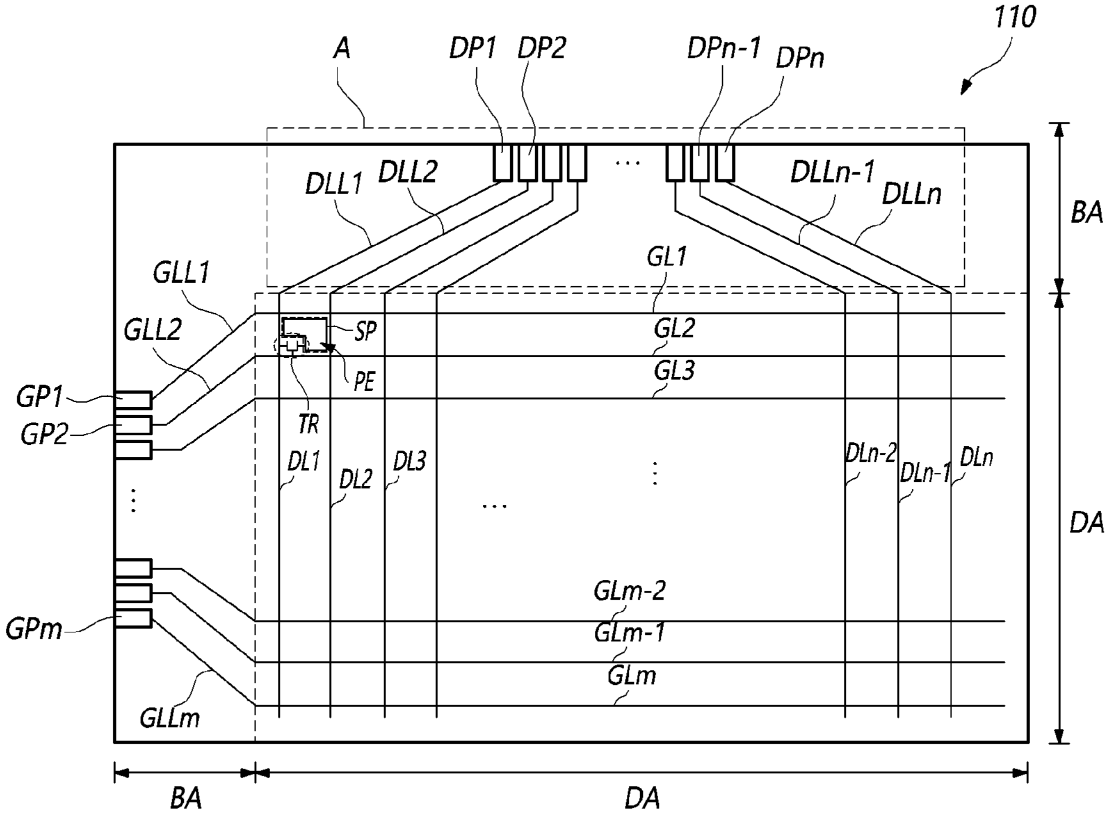
FIG. 4 is a plan diagram illustrating a display panel according to example aspects of the present disclosure.

FIG. 4 is a plan diagram illustrating a display panel according to example aspects of the present disclosure.

Referring to FIG. 4, the display panel 110 may be divided into a display area DA on which images are displayed and a bezel area BA outside the display area DA and on which no images are displayed.

In the display area DA, first to mth gate lines GL1 to GLm to which gate signals are applied in one direction and first to nth data lines DL1 to DLn to which data signals are applied may be arranged in the form of a matrix. The first to nth data lines DL1 to DLn intersect the first to mth gate lines GL1 to GLm to define a plurality of subpixels SP.

A plurality of transistors TR for driving the subpixels SP are provided at intersections of the first to mth gate lines GL1 to GLm and the first to nth data lines DL1 to DLn. Pixel electrodes PE in contact with the transistors are provided to correspond to the subpixels SP in a one-to-one relationship.

The first to mth gate lines GL1 to GLm and the first to nth data lines DL1 to DLn are connected to first to mth gate pads GP1 to GPm and first to nth data pads DP1 to DPn through first to mth gate link lines GLL1 to GLLm and first to nth data link lines DLL1 to DLLn formed in the bezel area BA, respectively.

Here, the first to mth gate pads GP1 to GPm are electrically connected to the gate driving circuit 120. An area in which the first to mth gate pads GP1 to GPm are formed corresponds to the area of the gate driving circuit 120. In another example, the first to mth gate pads GP1 to GPm may be formed as a part of the gate driving circuit 120.

In addition, the first to nth data pads DP1 to DPn are electrically connected to the data driving circuit 130. An area in which the first to nth data pads DP1 to DPn are formed corresponds to the area of the data driving circuit 130. In another example, the first to nth data pads DP1 to DPn may be formed as a part of the data driving circuit 130.

Figure 5:
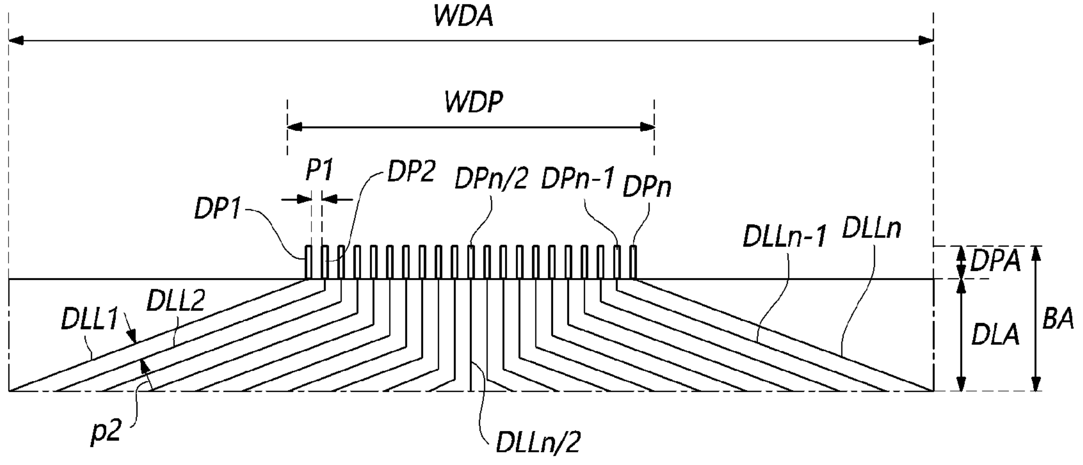
FIG. 5 is an example of an enlarged diagram of the part A in FIG. 4.

FIG. 5 is an example of an enlarged diagram of the part A in FIG. 4.

Referring to FIG. 5, the bezel area BA adjacent to the data driving circuit 130 may include a data link area DLA in which the data link lines DLL1 to DLLn are formed and a data pad part DPA in which the data pads DP1 to DPn are formed.

The first to nth data pads DP1 to DPn formed in the data pad part DPA are spaced apart from each other at predetermined pad pitches P1. The pad pitches P1 may be a separation distance between any two adjacent data pads.

The first to nth data link lines DLL1 to DLLn corresponding to the first to nth data pads DP1 to DPn in a one-to-one relationship serve to apply data signals to the first to nth data lines DL1 to DLn.

The width WDP of a data pad part in which the first to nth data pads DP1 to DPn are arranged in the horizontal direction corresponds to the width of the data driving circuit 130. Since the width of the data driving circuit 130 is narrower than the width WDA of the display area, the width WDP of the data pad part may be narrower than the width WDA of the display area.

Thus, in the display panel 110 of the related art, the first to nth data link lines DLL1 to DLLn have a slant structure. For example, the first to nth data link lines DLL1 to DLLn may extend in the form of slants from the first to nth data pads DP1 to DPn toward the display panel 110.

Here, the first to nth data link lines DLL1 to DLLn may be designed with the same widths, the first to nth data link lines DLL1 to DLLn may be spaced apart from each other at uniform link pitches P2. The link pitches P2 may be a separation distance between any two adjacent data link lines.

According to this slant structure, the lengths of the data link lines increase in the direction of from the n/(2−1)th data link line DLLn/2−1 to the first data link line DLL1 with respect to the n/2th data link line DLLn/2. The lengths of the data link lines also increase in the direction of from the (n/2+1)th data link line DLLn/2+1 to the nth data link line DLLn with respect to the n/2th data link line DLLn/2.

Here, the thickness of the data link area DLA may be determined in consideration of the difference between the width WDP of the data pad part and the width WDA of the display area and the link pitches P2 of the data link lines DLL1 to DLLn.

For example, the greater the difference between the width WDP of the data pad part and the width WDA of the display area, the closer the outermost data link lines DLL1 and DLLn are to the horizon. Thus, it is required to increase the distances between the data pads and the display area DA in consideration of the link pitches P2 of the data link lines DLL1 to DLLn.

For example, the greater the size or the higher the resolution of the display device 100, the greater the number of the data lines DL and the number of data link lines DLL are. As a result, the width of the data link area DLA is increased, thereby increasing the bezel area BA.

The display device 100 according to various aspects of the present disclosure may have a modified structure of data link lines to realize a narrow bezel and prevent or reduce degradations in image quality.

Figure 6:
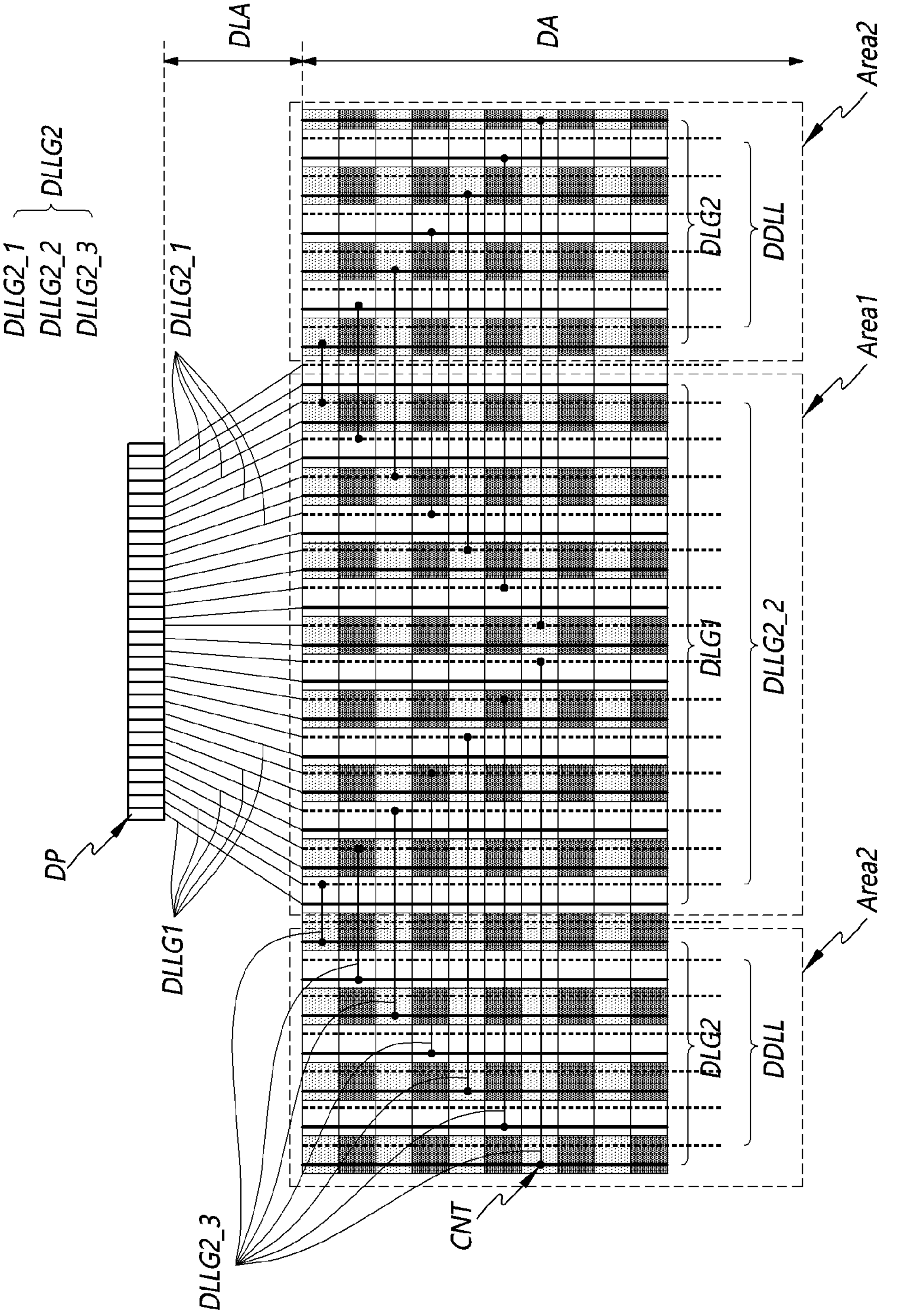
FIG. 6 is a plan diagram illustrating a structure of the display panel according to example aspects of the present disclosure.

FIG. 6 is a plan diagram illustrating a structure of the display panel according to various aspects of the present disclosure.

Referring to FIG. 6, the display panel 110 according to the present disclosure may be divided into a display area DA on which images are displayed and a bezel area BA outside or near to the display area DA and on which no images are displayed.

In FIG. 6, only a data pad part DP connected to the data driving circuit 130 and data link lines DLL extending from the data pad part DP in the direction of the display panel 110 are depicted in the bezel area BA.

A plurality of data lines DL extending in a first direction (e.g., a column direction) to receive data signals output from the data driving circuit 130 may be disposed in the display area DA. A plurality of gate lines GL extending in a second direction (e.g., a row direction) to receive gate signals output from the gate driving circuit 120 may be disposed in the display area DA. A plurality of subpixels SP may be formed in areas in which the gate lines GL intersect the data lines DL.

Here, for the convenience of description, the gate lines GL are not shown, and only the data link lines DLL and data lines DL are depicted.

The plurality of data lines DL may extend in parallel in the first direction (e.g., a column direction) of the display panel 110 from the data driving circuit 130.

The plurality of data lines DL may include a first data line group DLG1 disposed in a first area Area1 corresponding to the data driving circuit 130 and a second data line group DLG2 disposed in second areas Area2 located outside of the first area Area1. The first area Area1 corresponding to the data driving circuit 130 may be an area at least partially overlapping with the data pad part DP or the arrangement region of the data driving circuit 130.

In the display device 100 according to the present disclosure, the first data line group DLG1 disposed in the first area Area1 corresponding to the data driving circuit 130 is connected to a first data link line group DLLG1 having a linear structure and the second data line group DLG2 disposed in the second areas Area2 located outside of the first area Area1 is connected to a second data link line group DLLG2 having a bending structure to form the area in which the data driving circuit 130 is located into a narrow bezel.

The first area Area1 corresponding to the data driving circuit 130 is an area of the display area DA of the display panel 110 corresponding to the width of the data driving circuit 130. Since the first area Area1 corresponds to the data driving circuit 130 in the first direction (e.g., a column direction), the first data line group DLG1 disposed in the first area Area1 may be connected to the data driving circuit 130 using the first data link line group DLLG1 having a linear structure.

The first data link line group DLLG1 extends from the data driving circuit 130 and is connected to the first data line group DLG of the first area Area1 corresponding to the data driving circuit 130. Thus, the first data link line group DLLG1 may be located in the data link area DLA.

The second areas Area2 located outside of the first area Area1 correspond to portions of the display area DA disposed on both sides of the first area Area1. The display device 100 according to the present disclosure includes the second data link line group DLLG2 having a bending structure and connecting the second data line group DLG2 disposed in the second areas Area2 to the data driving circuit 130.

The second data link line group DLLG2 may include (2-1)th data link lines DLLG2_1, (2-2)th data link lines DLLG2_2, and (2-3)th data link lines DLLG2_3 to connect the second data line group DLG2 of the second areas Area2 located outside of the first area Area1.

The (2-1)th data link lines DLLG2_1 extend from the data pad part DP connected to the data driving circuit 130 to the first area Area1 corresponding to the data driving circuit 130.

The (2-2)th data link lines DLLG2_2 are disposed in the first direction (e.g., a column direction) to be in parallel to the first data line group DLG1 of the first area Area1 corresponding to the data driving circuit 130. The (2-2)th data link lines DLLG2_2 are formed in the display area DA. Here, the (2-2)th data link lines DLLG2_2 may be disposed to alternate with data lines of the first data line group DLG1.

The (2-1)th data link lines DLLG2_1 extend in the first direction (e.g., a column direction) and are connected to the (2-2)th data link lines DLLG2_2 in the first area Area1 corresponding to the data driving circuit 130. The (2-1)th data link lines DLLG2_1 may also have a linear structure extending in the first direction.

The (2-3)th data link lines DLLG2_3 extend in the second direction (e.g., a row direction) and are connected to the second data line group DLG2 of the second areas Area2 located outside of the first area Area1. The (2-3)th data link lines DLLG2_3 may be formed in the display area DA.

The second data line group DLG2 of the second areas Area2 located outside of the first area Area1 may be connected to the data driving circuit 130 through the (2-1)th data link lines DLLG2_1 extending from the data pad part DP, the (2-2)th data link lines DLLG2_2 disposed in parallel to the first data line group DLG1, and the (2-3)th data link lines DLLG2_3 extending in the second direction (e.g., a row direction).

The (2-3)th data link lines DLLG2_3 may be configured such that the lengths thereof increase as the distances from the data pad part DP increase. The (2-3)th data link lines DLLG2_3 may be connected to the (2-2)th data link lines DLLG2_2 and the second data line group DLG2 through contact holes. In addition, the (2-3)th data link lines DLLG2_3 may be formed on a different layer from the (2-2)th data link lines DLLG2_2 and the second data line group DLG2.

In addition, in consideration of capacitance due to the (2-2)th data link lines DLLG2_2 disposed in the first area Area1 corresponding to the data driving circuit 130, dummy data link lines DDLL may be further disposed to alternate with data lines of the second data line group DLG2 of the second areas Area2 located outside of the first area Area1.

As described above, when the second data line group DLG2 of the second areas Area2 located outside of the first area Area1 is connected using the (2-1)th data link lines DLLG2_1 extending from the data pad part DP, the (2-2)th data link lines DLLG2_2 disposed in parallel to the first data line group DLG1, and the (2-3)th data link lines DLLG2_3 extending in the second direction (e.g., a horizontal direction), link pitches between the data link lines may be maintained or secured even in the case in which the distances between the data pads and the display area DA are reduced.

Thus, the width of the data link area DLA may be reduced, thereby realizing a narrow bezel.

Figure 7:
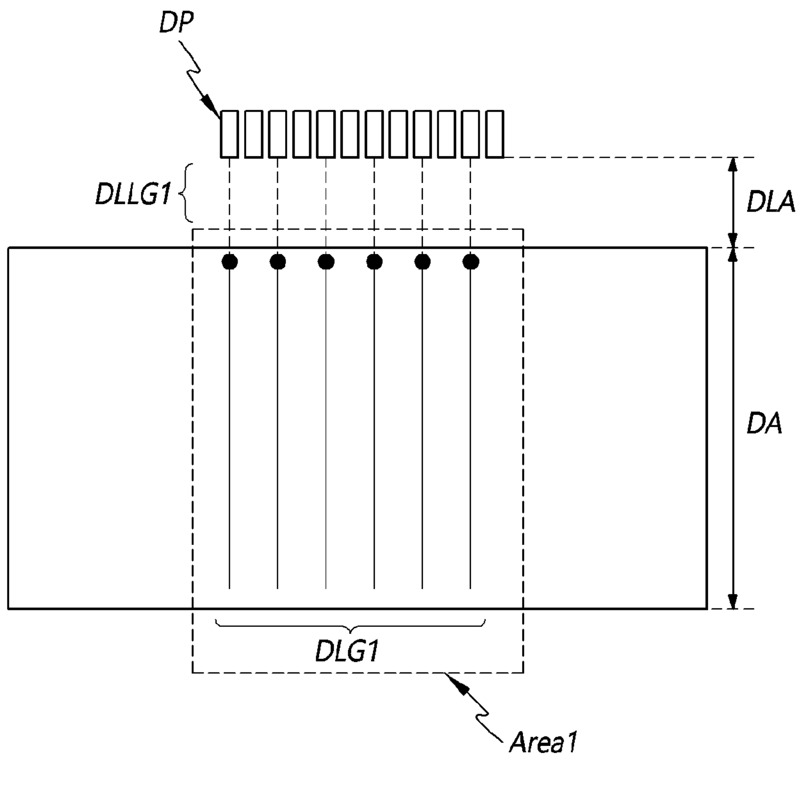
FIG. 7 is a diagram separately illustrating a connecting structure of data lines disposed in the first area corresponding to the data driving circuit in the display device according to example aspects of the present disclosure.
Figure 8:
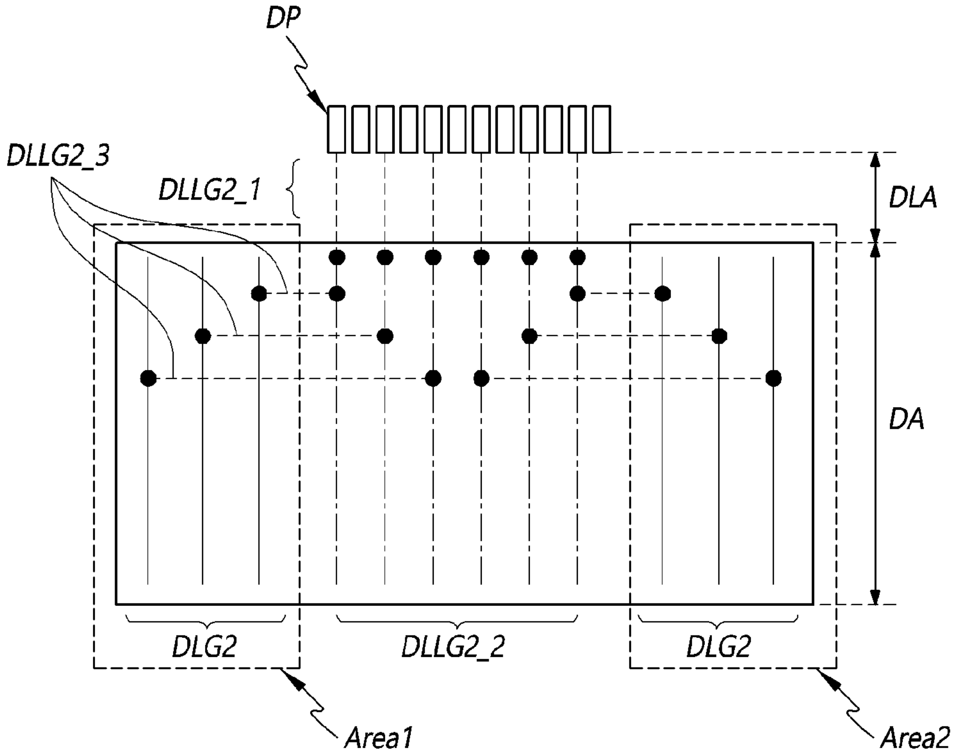
FIG. 8 is a diagram separately illustrating a connecting structure of data lines disposed in the second areas located outside of the first area in the display device according to example aspects of the present disclosure.

FIG. 7 is a diagram separately illustrating a connecting structure of data lines disposed in the first area corresponding to the data driving circuit in the display device according to various aspects of the present disclosure, and FIG. 8 is a diagram separately illustrating a connecting structure of data lines disposed in the second areas corresponding to the locations outside the data driving circuit in the display device according to various aspects of the present disclosure.

In FIGS. 7 and 8, the first area Area1 corresponding to the data driving circuit 130 and the second areas Area2 located outside of the first area Area1 are separately illustrated for the convenience of description.

First, referring to FIG. 7, in the display device 100 according to aspects, the first area Area1 corresponding to the data driving circuit 130 is a portion of the display area DA of the display panel 110 corresponding to the width of the data driving circuit 130. Since the first area Area1 is an area corresponding to the data driving circuit 130 in the first direction (e.g., a column direction), the first data line group DLG1 disposed in the first area Area1 may be connected to the data pad part DP through the first data link line group DLLG1 having a linear structure.

The first data link line group DLLG1 extends from the data pad part DP, and is directly connected to the first data line group DLG1 disposed in the first area Area1 corresponding to the data driving circuit 130. Thus, the first data link line group DLLG1 may be disposed in the data link area DLA.

Referring to FIG. 8, in the display device 100 according to various aspects of the present disclosure, the second areas Area2 located outside of the first area Area1 correspond to portions of the display area DA of the display panel 110 disposed on both sides of the first area Area1.

The second data line group DLG2 disposed in the second areas Area2 is connected to the data pad part DP through the second data link line group DLLG2 having a bending structure.

The second data link line group DLLG2 may include the (2-1)th data link lines DLLG2_1, the (2-2)th data link lines DLLG2_2, and the (2-3)th data link lines DLLG2_3.

The (2-1)th data link lines DLLG2_1 extend from the data pad part DP to the first area Area1 corresponding to the data driving circuit 130.

The (2-2)th data link lines DLLG2_2 are disposed in parallel to the first data line group DLG1 in the first area Area1.

The (2-1)th data link lines DLLG2_1 are connected to the(2-2)th data link lines DLLG2_2 in the first area Area1.

The (2-3)th data link lines DLLG2_3 extend in the second direction (e.g., a horizontal direction) and are connected to the second data line group DLG2 of the second areas Area2. The (2-3)th data link lines DLLG2_3 may be configured such that the lengths thereof increase as the distances from the data pad part DP increase.

Thus, the second data line group DLG2 of the second areas Area2 located outside of the first area Area1 may be connected to the data driving circuit 130 through the (2-1)th data link lines DLLG2_1 extending from the data pad part DP, the (2-2)th data link lines DLLG2_2 disposed in parallel to the first data line group DLG1, and the (2-3)th data link lines DLLG2_3 extending in the second direction (e.g., a horizontal direction).

The (2-3)th data link lines DLLG2_3 may be configured such that the lengths thereof increase as the distances from the data pad part DP increase. The (2-3)th data link lines DLLG2_3 may be connected to the (2-2)th data link lines DLLG2_2 and the second data line group DLG2 through contact holes. In addition, the (2-3)th data link lines DLLG2_3 may be formed on a different layer from the (2-2)th data link lines DLLG2_2 and the second data line group DLG2.

Figure 9:
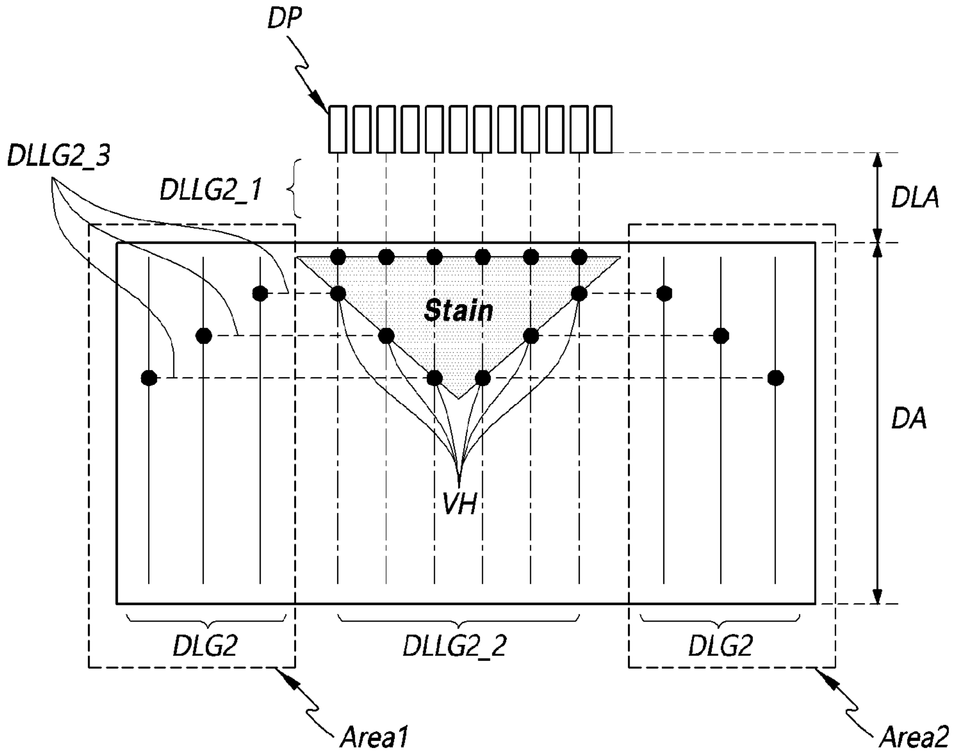
FIG. 9 is a diagram illustrating a case in which a stain is formed in an area due to a second data link line group during display driving in the display device according to example aspects of the present disclosure.

FIG. 9 is a diagram illustrating a case in which a stain is formed in an area due to the second data link line group during display driving in the display device according to various aspects of the present disclosure.

Referring to FIG. 9, in the display device 100 according to aspects, the first data line group DLG1 disposed in the first area Area1 corresponding to the data driving circuit 130 may be connected using the first data link line group DLLG1 having a linear structure, and the second data line group DLG2 disposed in the second areas Area2 located outside of the first area Area1 may be connected using the second data link line group DLLG2 having a bending structure.

Here, the second data link line group DLLG2 may include the (2-1) th data link lines DLLG2_1, the (2-2) th data link lines DLLG2_2, and the (2-3) th data link lines DLLG2_3 to connect the second data line group DLG2 of the second areas Area2 located outside of the first area Area1.

In this case, the (2-2)th data link lines DLLG2_2 and the (2-3)th data link lines DLLG2_3 are connected to the first area Area1 corresponding to the data driving circuit 130 in the display area DA. Bending points VH at which the 2-2)th data link lines DLLG2_2 are connected to the (2-3)th data link lines DLLG2_3 may be disposed in the form of a triangle. During display driving, a stain having a different luminance from other areas may appear in the area surrounded by the bending points VH.

Figure 10:
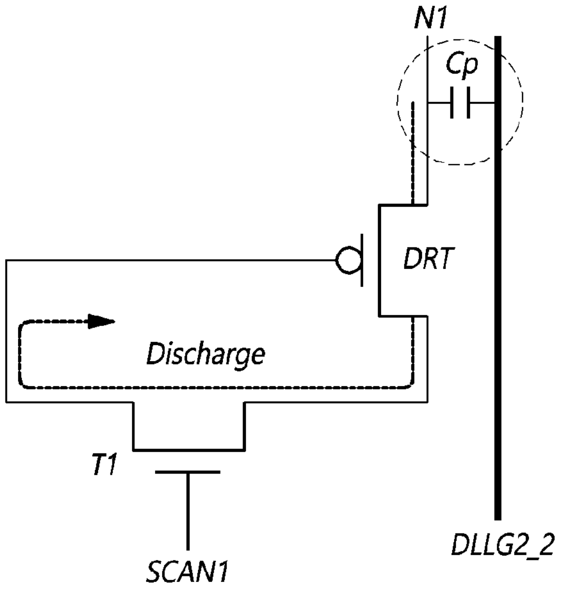
FIG. 10 is a circuit diagram illustrating a phenomenon in which a stain is formed due to a second data link line group having a bending structure in the display device according to example aspects of the present disclosure.
Figure 11:
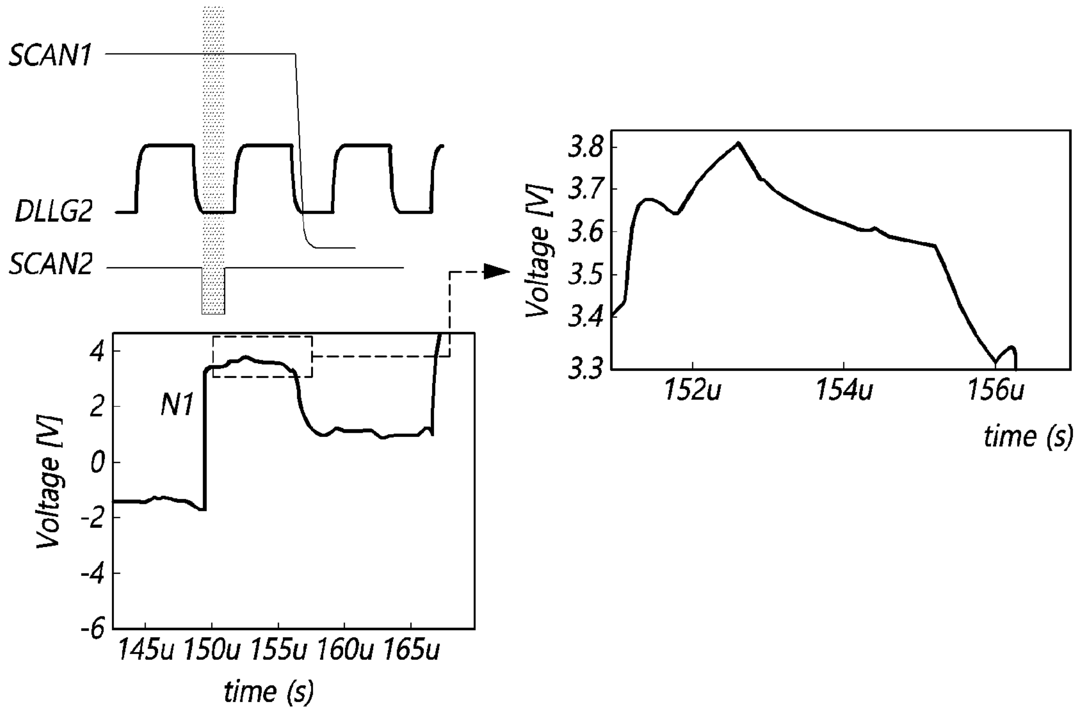
FIG. 11 is an example diagram illustrating signal fluctuations due to the second data link line group having a bending structure.

FIG. 10 is a circuit diagram illustrating a phenomenon in which a stain is formed due to the second data link line group having a bending structure in the display device according to various aspects of the present disclosure, and FIG. 11 is an example diagram illustrating signal fluctuations due to the second data link line group having a bending structure.

Referring to FIGS. 10 and 11, in the display device 100 according to aspects, a stain having a different luminance from other areas may appear in an area surrounded by the bending points VH at which the (2-2)th data link lines DLLG2_2 are connected to the (2-3)th data link lines DLLG2_3. According to an experiment result, this phenomenon is mainly caused by parasitic capacitance Cp created between a (2-2)th data link line DLLG2_2 and a source electrode N1 of a driving transistor DRT.

For example, it may be viewed that in a display driving period for displaying images on the display panel 110 or in a sensing driving period for detecting the characteristics values (e.g., the threshold voltage or mobility) of subpixels SP, the parasitic capacitance Cp increases at a point in time at which a voltage on the source electrode N1 of the driving transistor DRT is increased by a data voltage Vdata applied to the driving transistor DRT in a state in which first switching transistor T1 connecting the gate electrode and the drain electrode of the driving transistor DRT is turned on.

As a result, the operating characteristics of the driving transistors DRT are changed along the (2-2)th data link lines DLLG2_2 disposed in the first area Area1 corresponding to the data driving circuit 130, and thus a luminance difference occurs.

Thus, in the display device 100 according to the present disclosure, the (2-2) th data link lines DLLG2_2 disposed in the first area Area1 may be disposed to be spaced apart from the source electrodes N1 of the driving transistors DRT by predetermined distances or more to reduce the stain appearing in the area surrounded by the bending points VH at which the (2-2) th data link lines DLLG2_2 are connected to the (2-3) th data link lines DLLG2_3.

Figure 12:
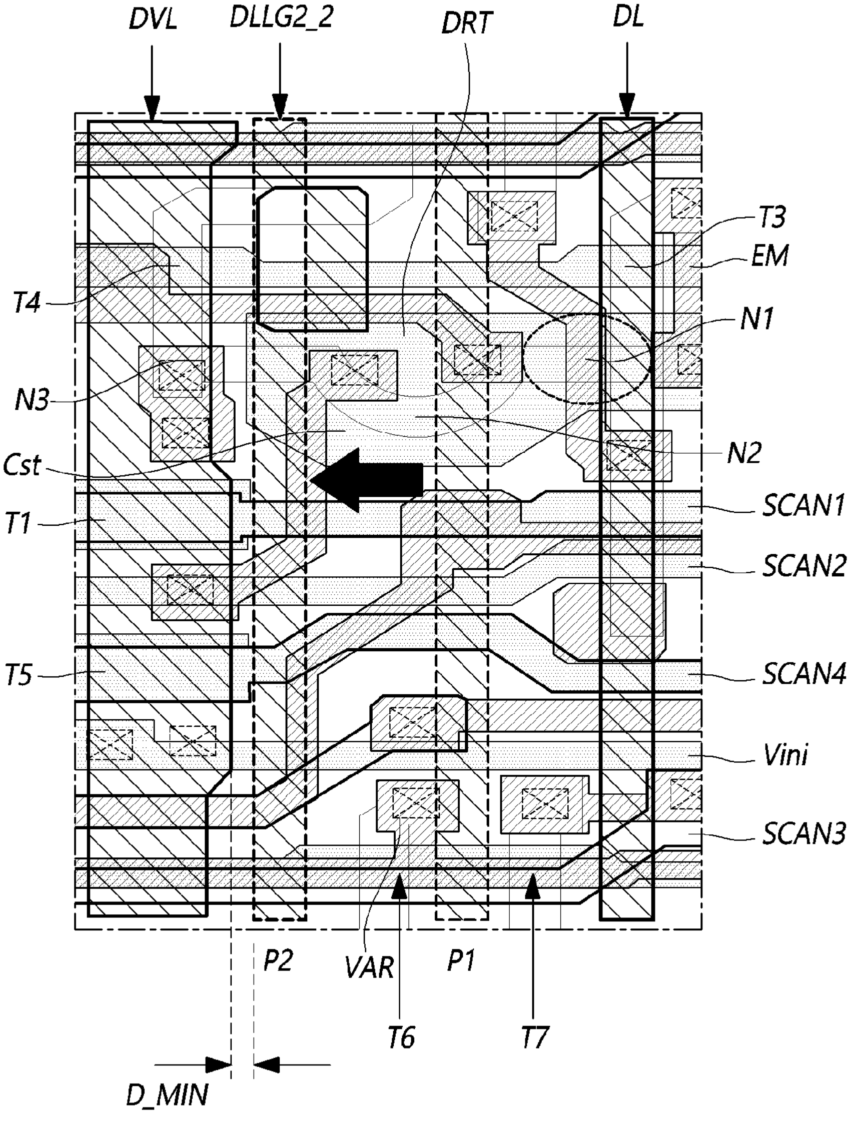
FIG. 12 is a plan diagram illustrating a subpixel in the display device according to example aspects of the present disclosure.

FIG. 12 is a plan diagram illustrating a subpixel in the display device according to various aspects of the present disclosure.

In FIG. 12, a plan diagram corresponding to the subpixel circuit of FIG. 3 is illustrated as an example.

Referring to FIG. 12, in the display device 100 according to aspects, a (2-2) th data link line DLLG2_2 formed in the first area Area1 corresponding to the data driving circuit 130 may be spaced apart from a source electrode N1 of a driving transistor DRT by a predetermined distance or longer to reduce a stain caused by the parasitic capacitance Cp creased between the (2-2) th data link line DLLG2_2 and the source electrode N1 of the driving transistor DRT.

For example, in the display device 100 according to the present disclosure, the (2-2)th data link lines DLLG2_2 formed in first area Area1 corresponding to the data driving circuit 130 of the second data link line group DLLG2 having a bending structure are disposed at positions distant from the source electrodes N1 of the driving transistors DRT.

Here, the (2-2)th data link line DLLG2_2 may be formed on the same layer as a driving voltage line DVL to which a high-potential driving voltage VDD is applied. In a case in which the (2-2)th data link lines DLLG2_2 are formed on the same layer as the driving voltage lines DVL as above, (2-2)th data link lines DLLG2_2 may be disposed at positions spaced apart from the driving voltage lines DVL by minimum processing distance D_MIN allowed in a fabrication process of the display panel 110.

For example, the minimum processing distance D_MIN allowed in a fabrication process of the display panel 110 may be 3 μm, but the present disclosure is not limited thereto.

In other words, in the display device 100 according to the present disclosure, when the (2-2) th data link lines DLLG2_2 of the second data link line group DLLG2 having a bending structure, formed in the first area Area1 corresponding to the data driving circuit 130, are disposed to alternate with the source electrodes N1 of the driving transistors DRT and the driving voltage lines DVL, the (2-2) th data link lines DLLG2_2 may be disposed at positions spaced apart from the driving voltage lines DVL by the minimum processing distance D_MIN to reduce the stain caused by the parasitic capacitance Cp.

Here, a case in which the (2−2) th data link line DLLG2_2 is moved from a first position P1 close to the source electrode N1 of the driving transistor DRT to a second position P2 spaced apart from the driving voltage line DVL by the minimum processing distance D_MIN is illustrated as an example. It is to be noted that the arrangement of the (2−2) th data link line DLLG2_2 with respect to the subpixels is described under the pixel structure shown in FIG. 3, but the present disclosure is not limited thereto. For example, if the structure of the subpixels changes in other aspects, the (2−2) th data link line DLLG2_2 shall also be disposed away from the driving transistor or a source electrode of the driving transistor, to reduce or minimize the influence of signals carried on the (2−2) th data link line DLLG2_2 to the subpixels in the first area. For example, the (2−2) th data link line DLLG2_2 may be disposed to be adjacent to a middle point of a source electrode of a driving transistor in a first subpixel and another source electrode of another driving transistor in a second subpixel adjacent to the first subpixel in a row direction or a horizontal direction.

Figure 13:
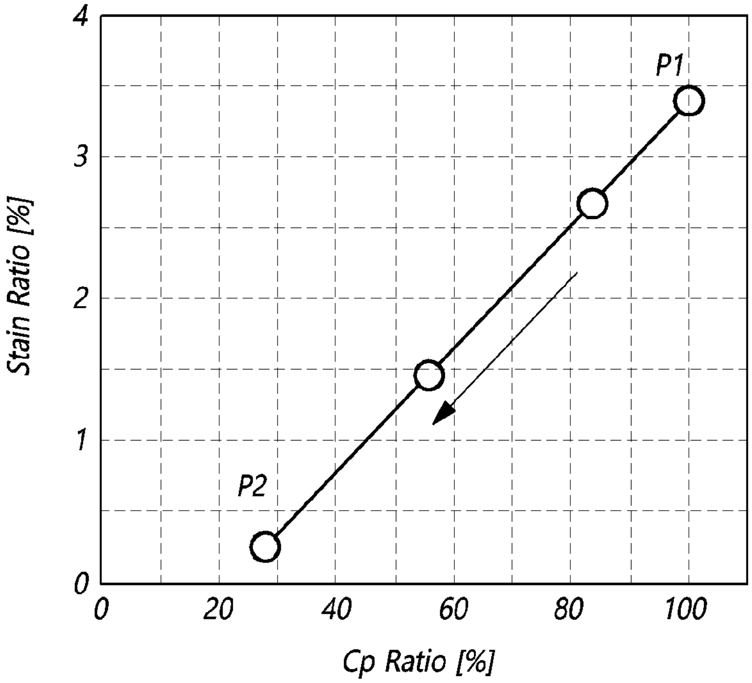
FIG. 13 is an experimental graph illustrating changes in parasitic capacitance and a stain according to the position of (2-2)th data link lines formed in the first area corresponding to the data driving circuit in the display device according to example aspects of the present disclosure.

FIG. 13 is an experimental graph illustrating changes in parasitic capacitance and a stain according to the position of (2−2)th data link lines formed in the first area corresponding to the data driving circuit in the display device according to various aspects of the present disclosure.

Referring to FIG. 13, in the display device 100 according to aspects, the (2−2) th data link lines DLLG2_2 of the second data link line group DLLG2 having a bending structure, formed in the first area Area1 corresponding to the data driving circuit 130, may be disposed at positions distant from the source electrodes N1 of the driving transistors DRT to reduce the stain caused by the parasitic capacitance Cp.

For example, as illustrated in FIG. 12, when a case in which the (2−2)th data link lines DLLG2_2 are disposed at first positions P1 close to the source electrodes N1 of the driving transistors DRT is compared with a case in which the (2−2)th data link lines DLLG2_2 are disposed at second positions P2 distant from the source electrodes N1 of the driving transistors DRT and close to the driving voltage lines DVL, it may be viewed that the parasitic capacitance Cp is generated in inverse proportion to the distances of the (2−2)th data link lines DLLG2_2 from the source electrodes N1 of the driving transistors DRT.

As a result, the stain caused by the parasitic capacitance Cp created between the (2−2)th data link lines DLLG2_2 and the source electrodes N1 of the driving transistors DRT may be reduced.

As described above, when the second data line group DLG2 of the second areas Area2 located outside of the first area Area1 is connected through the second data link line group DLLG2 having a bending structure, the (2−2) th data link lines DLLG2_2 formed in the first area Area1 corresponding to the data driving circuit 130 may be disposed at positions distant from the source electrodes N1 of the driving transistors DRT to reduce the stain caused by the parasitic capacitance Cp.

The above-described aspects of the present disclosure will be briefly reviewed as follows.

A display device 100 according to various aspects of the present disclosure may include: a display panel 110 including a plurality of subpixels SP, a plurality of data lines DL, and a plurality of gate lines GL; a data driving circuit 130 supplying a data voltage to the plurality of data lines DL; a gate driving circuit 120 supplying a gate signal to the plurality of gate lines GL; and a timing controller 140 controlling the data driving circuit 130 and the gate driving circuit 120. The display panel 110 may include a display area. The display area may include a first area Area1 corresponding to the data driving circuit 130 and a second areas Area2 located outside of the first area Area1. The display device 100 may further include: a first data link line group DLLG1 having a linear structure and connected to a first data line group DLG1 of data lines among the plurality of data lines disposed in the first area Area1; and a second data link line group DLLG2 having a bending structure and connected to a second data line group DLG2 of data lines among the plurality of data lines disposed in the second areas Area2.

The first data link line group DLLG1 may be disposed between the data driving circuit 130 and the first area Area1 in the bezel area BA.

The second data link line group DLLG2 having a bending structure may include: (2−1)th data link lines DLLG2_1 extending from the data driving circuit 130 to the first area Area1; (2−2)th data link lines DLLG2_2 disposed in the first area Area1 and connected to the (2−1)th data link lines DLLG2_1; and (2−3)th data link lines DLLG2_3 connecting the (2−2)th data link lines DLLG2_2 and the second data line group DLG2.

The (2−1)th data link lines DLLG2_1 may linearly connect the data driving circuit 130 and the first data line group DLG1.

The (2−2)th data link lines DLLG2_2 may be disposed in parallel to the first data line group DLG1.

The (2−3)th data link lines DLLG2_3 may extend from the first area Area1 in a row direction and be linearly connected to the second data line group DLG2 disposed in the second areas Area.

The (2−3)th data link lines DLLG2_3 may be configured such that lengths thereof increase as the distances from the data driving circuit 130 increase.

The display device 100 may further include dummy data link lines disposed to alternate with data lines of the second data line group DLG2 of the second areas Area2.

Each of the subpixels SP may include: a light-emitting element ED; a driving transistor DRT supplying driving current to the light-emitting element ED; a first switching transistor T1 having a gate electrode to which a first scan signal SCAN1 is applied, a drain electrode connected to a gate electrode of the driving transistor DRT, and a source electrode connected to a drain electrode of the driving transistor DRT; a second switching transistor T2 having a gate electrode to which a second scan signal is applied, a source electrode to which a data voltage is applied, and a drain electrode connected to a source electrode of the driving transistor DRT; a third switching transistor T3 having a gate electrode to which an emission signal is applied, a source electrode to which a high-potential driving voltage VDD is applied through a driving voltage line DVL, and a drain electrode connected to the source electrode of the driving transistor DRT; a fourth switching transistor T4 having a gate electrode to which the emission signal is applied, a source electrode connected to the drain electrode of the driving transistor DRT, and a drain electrode connected to an anode of the light-emitting element ED; a fifth switching transistor T5 having a gate electrode to which a fourth scan signal SCAN4 is applied, a drain electrode to which a stabilization voltage is supplied, and a source electrode connected to the gate electrode of the driving transistor DRT and a storage capacitor Cst; a sixth switching transistor T6 having a gate electrode to which a third scan signal SCAN3 is applied, a source electrode to which a reset voltage is supplied, and a drain electrode connected to the anode of the light-emitting element ED; and a seventh switching transistor T7 having a gate electrode to which a fifth scan signal SCAN5 is applied, a source electrode to which a bias voltage is supplied, and a drain electrode connected to the source electrode of the driving transistor DRT.

Each of the (2-2)th data link lines DLLG2_2 may be disposed between the source electrode of the driving transistor DRT and to be close to the driving voltage line DVL.

Each of the (2-2)th data link lines DLLG2_2 may be disposed at a position spaced apart from the driving voltage line DVL by a minimum processing distance.

In addition, a display panel 110 according to the present disclosure may include: a plurality of subpixels SP; a plurality of data lines DL including a first data line group DLG1 disposed in a first area Area1 corresponding to a data driving circuit 130 and a second data line group DLG2 disposed in a second areas Area2 located outside of the first area Area1; a plurality of gate lines GL; a first data link line group DLLG1 having a linear structure connected to the first data line group DLG1 disposed in the first area Area1; and a second data link line group DLLG2 having a bending structure connected to the second data line group DLG2 disposed in the second areas Area2.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the technical idea and scope of the present disclosure. The above description and the accompanying drawings provide an example of the technical idea of the present disclosure for illustrative purposes only. For example, the disclosed aspects are intended to illustrate the scope of the technical idea of the present disclosure.

It will be apparent to those skilled in the art that various modifications and variations can be made in the display device and the display panel of the present disclosure without departing from the spirit or scope of the aspects. Thus, it is intended that the present disclosure covers the modifications and variations of the aspects provided they come within the scope of the appended claims and their equivalents.

What is claimed is:

1. A display device comprising:

a display panel comprising a plurality of data lines and a plurality of gate lines;

a data driving circuit supplying a data voltage to the plurality of data lines;

wherein the display panel includes a display area;

wherein the display area includes a first area corresponding to the data driving circuit and a second area located outside the first area;

a first data link line group having a linear structure and connected to a first data line group disposed in the first area among the plurality of data lines; and a second data link line group having a bending structure and connected to a second data line group disposed in the second areas among the plurality of data lines, wherein a bending point of the bending structure is located within the first area, and wherein the second data link line group having the bending structure comprises:

(2-1)th data link lines extending from the data driving circuit to the first area;

(2-2)th data link lines disposed in the first area and connected to the (2-1)th data link lines; and (2-3)th data link lines connecting the (2-2)th data link lines and the second data line group.

2. The display device according to claim 1, wherein the first data link line group is disposed between the data driving circuit and the first area.

3. The display device according to claim 1, wherein the (2-1)th data link lines linearly connect the data driving circuit and the (2-2)th data link lines.

4. The display device according to claim 1, wherein the (2-2)th data link lines are disposed in parallel to the first data line group.

5. The display device according to claim 1, wherein the (2-3)th data link lines extend from the first area in parallel to the plurality of gate lines and are linearly connected to the second data line group disposed in the second areas.

6. The display device according to claim 1, wherein the (2-3)th data link lines are configured such that lengths thereof increase as distances from the data driving circuit increase.

7. The display device according to claim 1, wherein the (2-3)th data link lines are provided on a different layer from the second data line group.

8. The display device according to claim 1, further comprising dummy data link lines disposed to alternate with the data lines of the second data line group of the second areas.

9. The display device according to claim 1, wherein the display panel further comprises a plurality of subpixels provided at intersections of the plurality of data lines and the plurality of gate lines, and wherein each of the subpixels comprises:

a light-emitting element; and a driving transistor supplying driving current to the light-emitting element, wherein each of the (2-2)th data link lines is disposed to spaced away from the driving transistor or a source electrode of the driving transistor.

10. The display device according to claim 9, wherein each of the subpixels further comprises:

a first switching transistor having a gate electrode to which a first scan signal is applied, a drain electrode connected to a gate electrode of the driving transistor, and a source electrode connected to a drain electrode of the driving transistor;

a second switching transistor having a gate electrode to which a second scan signal is applied, a source electrode to which a data voltage is applied, and a drain electrode connected to the source electrode of the driving transistor;

a third switching transistor having a gate electrode to which an emission signal is applied, a source electrode to which a high-potential driving voltage is applied through a driving voltage line, and a drain electrode connected to the source electrode of the driving transistor;

a fourth switching transistor having a gate electrode to which the emission signal is applied, a source electrode connected to the drain electrode of the driving transistor, and a drain electrode connected to an anode of the light-emitting element;

a fifth switching transistor having a gate electrode to which a fourth scan signal is applied, a drain electrode to which a stabilization voltage is supplied, and a source electrode connected to the gate electrode of the driving transistor and a storage capacitor;

a sixth switching transistor having a gate electrode to which a third scan signal is applied, a source electrode to which a reset voltage is supplied, and a drain electrode connected to the anode of the light-emitting element; and a seventh switching transistor having a gate electrode to which a fifth scan signal is applied, a source electrode to which a bias voltage is supplied, and a drain electrode connected to the source electrode of the driving transistor.

11. The display device according to claim 9, wherein each of the (2-2)th data link lines is disposed between the source electrode of the driving transistor and a driving voltage line, and disposed to be closer to the driving voltage line rather than the source electrode of the driving transistor.

12. The display device according to claim 11, wherein each of the (2-2)th data link lines is disposed at a position spaced apart from the driving voltage line by a minimum processing distance.

13. A display panel comprising:

a plurality of subpixels;

a plurality of data lines comprising a first data line group disposed in a first area corresponding to a data driving circuit and a second data line group disposed in a second area located outside the first area;

a plurality of gate lines;

a first data link line group having a linear structure and connected to the first data line group disposed in the first area; and a second data link line group having a bending structure and connected to the second data line group disposed in the second areas, wherein a bending point of the bending structure is located within the first area, and wherein the second data link line group having the bending structure comprises:

(2-1)th data link lines extending from the data driving circuit to the first area;

(2-2)th data link lines disposed in the first area and connected to the (2-1)th data link lines; and (2-3)th data link lines connecting the (2-2)th data link lines and the second data line group.

* * * * *